United States Patent
Chen et al.

(10) Patent No.: US 9,613,339 B2
(45) Date of Patent: Apr. 4, 2017

(54) INFORMATION EXCHANGE IN THE SOCIAL NETWORK ENVIRONMENT

(75) Inventors: Feng-Wei Chen, Cary, NC (US); John R. Hind, Raleigh, NC (US); Joseph D. Johnson, Raleigh, NC (US); Yongcheng Li, Cary, NC (US); Josef Scherpa, Fort Collins, CO (US)

(73) Assignee: International Business Machines Corporation, Armonk, NY (US)

( * ) Notice: Subject to any disclaimer, the term of this patent is extended or adjusted under 35 U.S.C. 154(b) by 52 days.

(21) Appl. No.: 13/173,093

(22) Filed: Jun. 30, 2011

(65) Prior Publication Data

US 2013/0007141 A1  Jan. 3, 2013

(51) Int. Cl.
G06F 15/16 (2006.01)
G06Q 10/10 (2012.01)
H04L 12/58 (2006.01)

(52) U.S. Cl.
CPC ............ G06Q 10/10 (2013.01); H04L 51/32 (2013.01)

(58) Field of Classification Search
CPC ................................ G06Q 10/10; H04L 51/32
USPC .................................................. 709/204, 206
See application file for complete search history.

(56) References Cited

U.S. PATENT DOCUMENTS

| | | | |
|---|---|---|---|
| 6,286,104 B1 * | 9/2001 | Buhle et al. ...................... | 726/4 |
| 7,305,402 B2 | 12/2007 | Hind et al. | |
| 7,433,876 B2 | 10/2008 | Spivack et al. | |
| 8,180,804 B1 * | 5/2012 | Narayanan et al. .......... | 707/798 |
| 8,244,848 B1 * | 8/2012 | Narayanan et al. .......... | 709/223 |
| 2005/0201290 A1 | 9/2005 | Vasudev et al. | |
| 2007/0118539 A1 | 5/2007 | Hildrum et al. | |
| 2008/0104128 A1 * | 5/2008 | Drayer et al. ................ | 707/200 |
| 2008/0104225 A1 | 5/2008 | Zhang et al. | |
| 2009/0077064 A1 | 3/2009 | Daigle | |

(Continued)

FOREIGN PATENT DOCUMENTS

| | | |
|---|---|---|
| CN | 101903874 A | 12/2010 |
| WO | 2011009101 A1 | 1/2011 |

OTHER PUBLICATIONS

Adie, C.,"Network Access to Multimedia Information (RFC1614)," www.ip.com/IPCOM000002450D, May 1, 1994.

(Continued)

*Primary Examiner* — Abdulkader M Alriyashi
(74) *Attorney, Agent, or Firm* — Robert A. Voigt, Jr.; Winstead, P.C.

(57) ABSTRACT

A system and computer program product for improving information exchange in a social network environment. Actions (e.g., copying) being performed on an electronic object (e.g., e-mail) are detected. Furthermore, the entry of the electronic object in a social networking website is detected thereby identifying an association between this electronic object and this social networking website. Rule patterns are identified based on these detected actions and these associations. Indications of these associations are stored in terms of concept nodes in a hierarchical tree using the identified rule patterns. Social networking feeds of interest are then searched using the hierarchical tree as well as a current electronic object of a user (e.g., status message on a social networking feed, e-mail). The user would then be provided an opportunity to repost an information nugget from the current electronic object in one or more of these social networking feeds of interest.

12 Claims, 6 Drawing Sheets

(56) References Cited

U.S. PATENT DOCUMENTS

| | | | |
|---|---|---|---|
| 2009/0089678 A1 | 4/2009 | Sacco et al. | |
| 2009/0119584 A1 | 5/2009 | Herbst | |
| 2009/0125230 A1 | 5/2009 | Sullivan | |
| 2010/0205541 A1 | 8/2010 | Rapaport et al. | |
| 2010/0250643 A1 | 9/2010 | Savage et al. | |
| 2011/0040760 A1* | 2/2011 | Fleischman et al. | 707/737 |
| 2012/0005224 A1* | 1/2012 | Ahrens et al. | 707/769 |
| 2012/0102121 A1* | 4/2012 | Wu et al. | 709/206 |
| 2012/0166452 A1* | 6/2012 | Tseng | 707/749 |
| 2012/0179573 A1* | 7/2012 | Falcone et al. | 705/26.8 |

OTHER PUBLICATIONS

Daly, et al., "Social Network Analysis for Routing in Disconnected Dely-Tolerant MANETs," MobiHoc'07, Proceedings of 8th Intn'l Symposium on Mobile AdHoc Netwk&Comp, Sep. 2007.

Ilyas et al., "A Distributed and Privacy Preserving Algorithm for Identifying Information Hubs in Social Networks," http://www.egr.msu.edu/waves/people/usman_files/INFOCOM2011_FB_PCC_CR.pdf, 2010.

Hanneman, et al., "Introduction to Social Network Methods," http://www.faculty.ucr.edu/~hanneman/nettext, Dec. 2009.

Office Action for U.S. Appl. No. 13/405,286 with a mailing date of Dec. 20, 2012.

International Search Report for International Application No. PCT/CA2012/050437 dated Oct. 2, 2013, pp. 1-4.

Office Action for U.S. Appl. No. 13/405,286 dated Apr. 26, 2013.

Office Action for U.S. Appl. No. 13/405,286 dated Sep. 1, 2016, pp. 1-10.

* cited by examiner

INFORMATION EXCHANGE IN THE SOCIAL NETWORK ENVIRONMENT

TECHNICAL FIELD

The present invention relates to communicating using computer-based technology, and more particularly to improving information exchange in the social network environment.

BACKGROUND

There are various means of communicating among people using computer-based technology. Such traditional forms include electronic mail, commonly called e-mail, which is a method of exchanging digital messages from an author to one or more recipients. Another traditional form includes instant messaging, referring to real-time direct text-based communication between two or more people using personal computers or other devices.

A more recent type of communication using computer-based technology involves social networking A social networking service is an online service, platform, or site that focuses on building and reflecting of social networks or social relations among people (e.g., who share interests and/or activities). A social network service essentially consists of a representation of each user (often a profile), his/her social links, and a variety of additional services. Most social network services are web based and provide means for users to interact over the Internet. Social networking sites allow users to share ideas, activities, events, and interests within their individual networks.

Currently, a great deal of information is created using traditional communication tools, such as e-mail, but is not made available on social networks, including blogs, forums, communities, due to the manual complexity of recognizing important information nuggets (portions of information) and copying such information nuggets to an appropriate public venue for consumption by the greater social network. Furthermore, information nuggets provided on a social network (e.g., posted comments or status updates) are not easily reposted on other social networking feeds.

Hence, information is not easily exchanged from traditional forms of communication (e.g., e-mail) to more recent types of communication (e.g., social networks) or even among different social networking feeds.

BRIEF SUMMARY

In one embodiment of the present invention, a computer program product embodied in a computer readable storage medium for improving information exchange in a social network environment comprises the programming instructions for detecting actions performed on an electronic object. The computer program product further comprises the programming instructions for detecting entry of said electronic object in a social networking website. Additionally, the computer program product comprises the programming instructions for identifying an association between the social networking website and the electronic object. Furthermore, the computer program product comprises the programming instructions for identifying one or more rule patterns based on the detected actions, the detected entry of the electronic object in the social networking website and the identified association between the networking website and the electronic object. In addition, the computer program product comprises the programming instructions for storing an indication of the association between the social networking website and the electronic object in terms of concept nodes in a hierarchical tree using the identified one or more rule patterns. Furthermore, the computer program product comprises the programming instructions for searching for any social networking feeds of interest using the hierarchical tree as well as a current electronic object of a user.

Another form of the embodiment of the computer program product described above is in a system.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for improving information exchange in a social network environment. In one embodiment of the present invention, actions (e.g., copying, highlighting) being performed on an electronic object (e.g., e-mail, status update, comment) are detected. Furthermore, the entry of the electronic object in a social networking website (e.g., sports group blog) is detected thereby identifying an association between this electronic object and this social networking website. Rule patterns are identified based on these detected actions and these associations between electronic objects and social networking websites. Indications of these associations are stored in terms of concept nodes in a hierarchical tree using the identified rule patterns. Social networking feeds of interest are then searched using the hierarchical tree as well as a current electronic object of a user (e.g., status message on a social networking feed, instant message, e-mail). The user would then be provided an opportunity to repost an information nugget from the current electronic object in one or more of these social networking feeds of interest. In this manner, the user can more effectively exchange information with other users by responding to these social networking feeds using information nuggets from traditional forms of communication (e.g., e-mail) as well as reposting previously posted messages on other social networking feeds.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
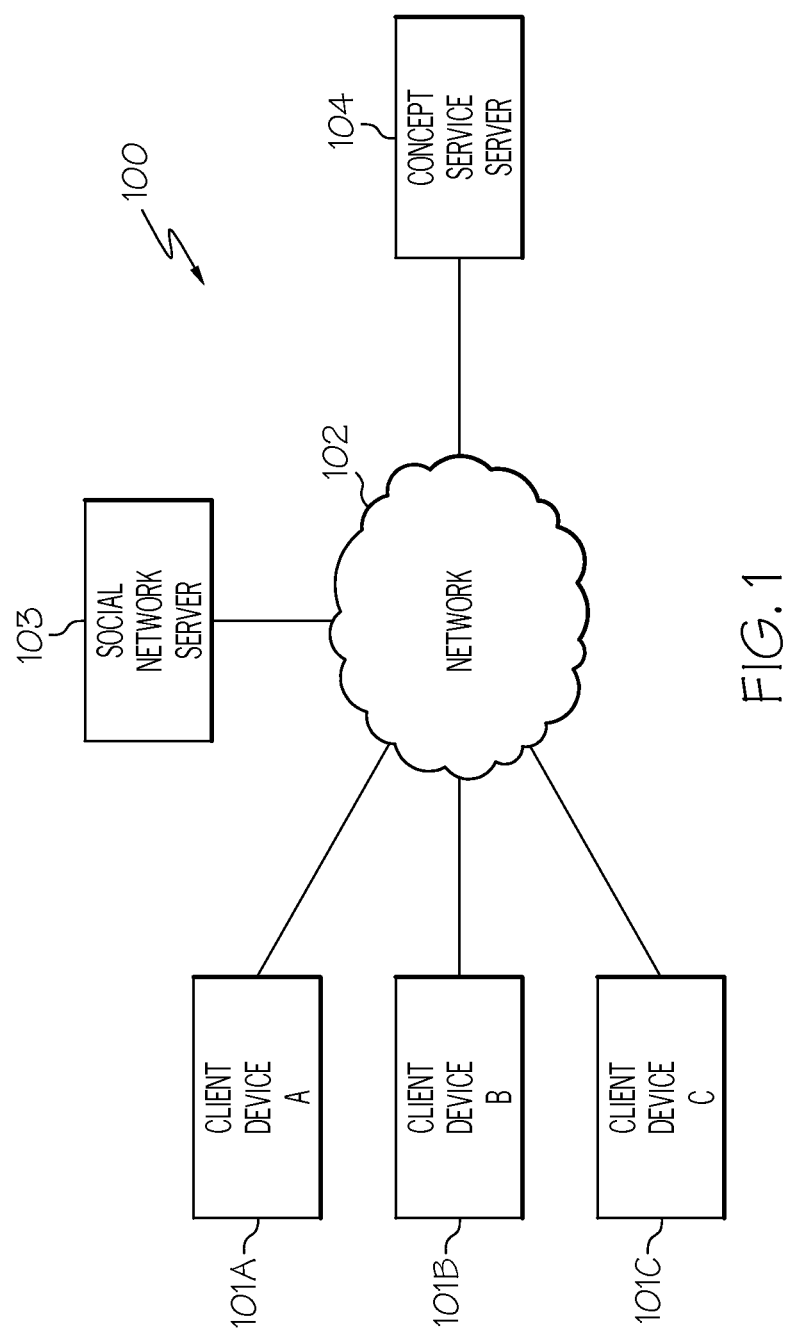
FIG. 1 illustrates a social network system configured in accordance with an embodiment of the present invention.

Referring now to the Figures in detail, FIG. 1 illustrates a social network system 100 configured in accordance with an embodiment of the present invention. Referring to FIG. 1, social network system 100 includes a community of users using client devices 101A-101C (identified as "Client Device A," "Client Device B," and "Client Device C," respectively, in FIG. 1) to be involved in social network system 100. Client devices 101A-101C may collectively or individually be referred to as client devices 101 or client device 101, respectively. Client device 101 may be a personal computing system, a mobile phone, a personal digital assistance (PDA), a gaming unit, a portable computing unit, and the like.

Client devices 101 may participate in a social network by communicating (by wire or wirelessly) over a network 102, which may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

System 100 further includes a social network server 103, which may be a web server configured to offer a social networking and/or microblogging service, enabling users of client devices 101 to send and read other users' posts. "Posts," as used herein, include any one or more of the following: text (e.g., comments, sub-comments and replies), audio, video images, etc. Social network server 103 is connected to network 102 by wire or wirelessly. While FIG. 1 illustrates a single social network server 103, it is noted for clarity that multiple servers may be used to implement the social networking and/or microblogging service.

System 100 further includes a concept service server 104 connected to network 102 by wire or wirelessly. Concept service server 104 is trained to identify rule patterns (e.g., presence of the string "Detroit Tigers" in an electronic object denotes that the electronic object is associated with a particular sports forum) and associations of electronic objects (e.g., e-mails) with social networking websites as discussed in further detail below. A description of the hardware configuration of concept service server 104 is provided below in connection with FIG. 2.

System 100 is not to be limited in scope to any one particular network architecture. System 100 may include any number of clients 101, social network servers 103 and concept service servers 104. Furthermore, in one embodiment, concept service server 104 may be part of social network server 103.

Figure 2:
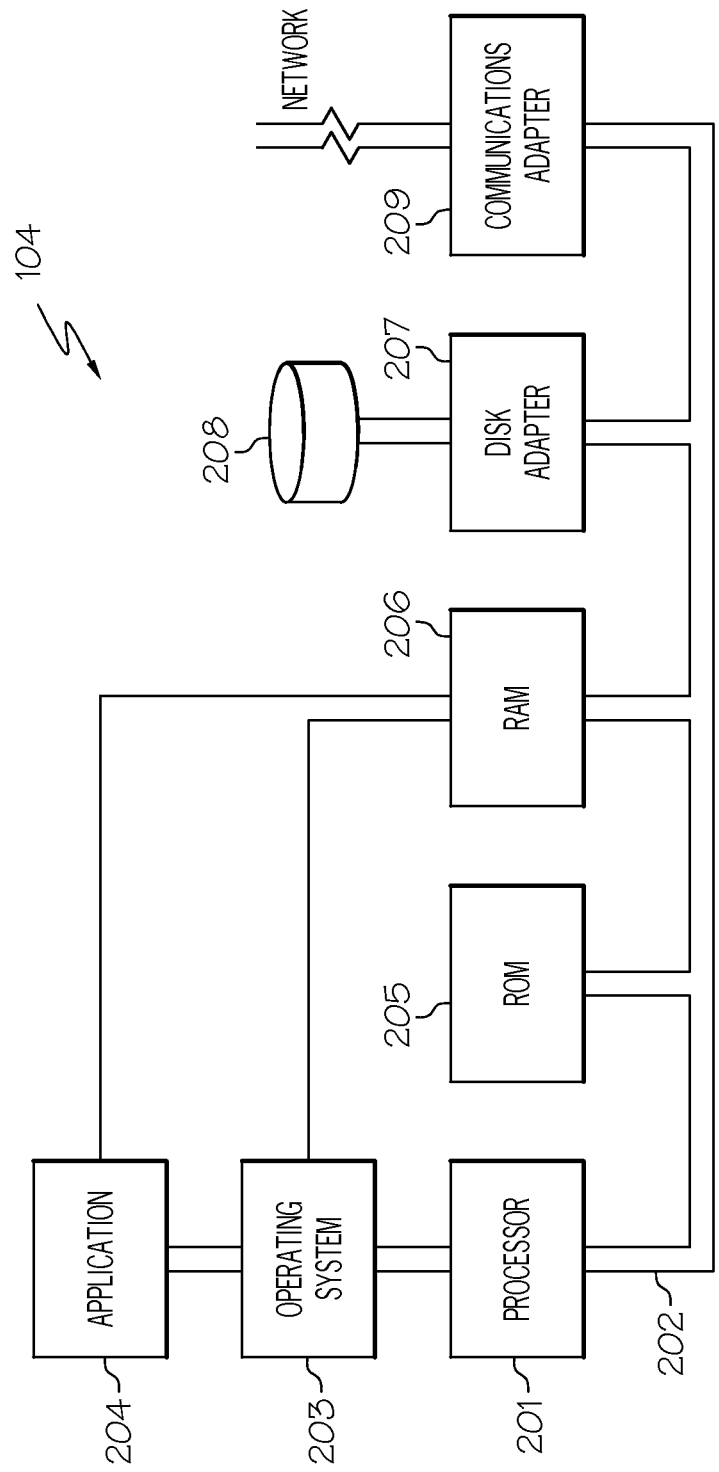
FIG. 2 illustrates a hardware configuration of a concept service server configured in accordance with an embodiment of the present invention.

Referring now to FIG. 2, FIG. 2 illustrates a hardware configuration of a concept service server 104 (FIG. 1) which is representative of a hardware environment for practicing the present invention. Referring to FIG. 2, concept service server 104 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for effectively exchanging information from traditional forms of communication (e.g., e-mail) to more recent types of communication (e.g., social networks) or even among different social networking feeds, as discussed further below in association with FIGS. 3-6.

Referring again to FIG. 2, read-only memory ("ROM") 205 is coupled to system bus 202 and includes a basic input/output system ("BIOS") that controls certain basic functions of concept services server 104. Random access memory ("RAM") 206 and disk adapter 207 are also coupled to system bus 202. It should be noted that software components including operating system 203 and application 204 may be loaded into RAM 206, which may be concept service server's 104 main memory for execution. Disk adapter 207 may be an integrated drive electronics ("IDE") adapter that communicates with a disk unit 208, e.g., disk drive. It is noted that the program for effectively exchanging information from traditional forms of communication (e.g., e-mail) to more recent types of communication (e.g., social networks) or even among different social networking feeds, as discussed further below in association with FIGS. 3-6, may reside in disk unit 208 or in application 204.

Concept service server 104 may further include a communications adapter 209 coupled to bus 202. Communications adapter 209 interconnects bus 202 with an outside network (network 102) thereby allowing concept service server 104 to communicate with client devices 101 and social network servers 103.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to product a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, currently, a great deal of information is created using traditional communication tools, such as e-mail, but is not made available on social networks, including blogs, forums, communities, due to the manual complexity of recognizing important information nuggets (portions of information) and copying such information nuggets to an appropriate public venue for consumption by the greater social network. Furthermore, information nuggets provided on a social network (e.g., posted comments or status updates) are not easily reposted on other social networking feeds. Hence, information is not easily exchanged from traditional forms of communication (e.g., e-mail) to more recent types of communication (e.g., social networks) or even among different social networking feeds.

Figure 3:
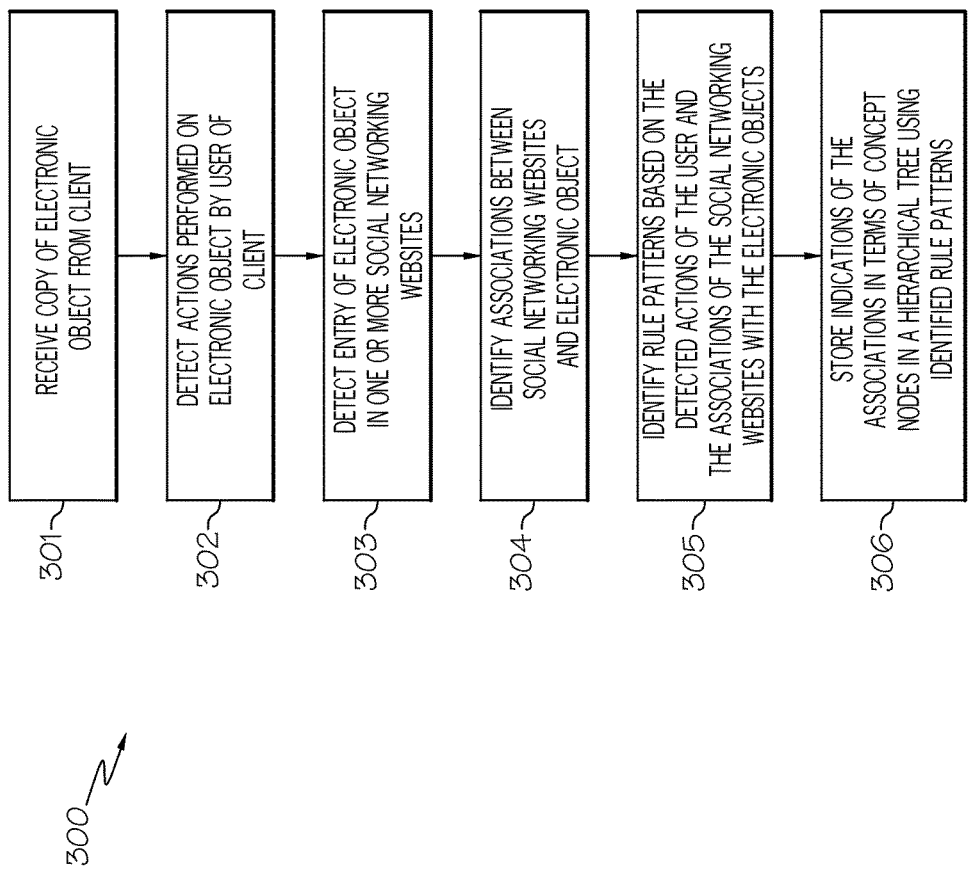
FIG. 3 is a flowchart of a method for training the concept service server to heuristically associate information nuggets with particular social networking websites in accordance with an embodiment of the present invention.
Figure 4:
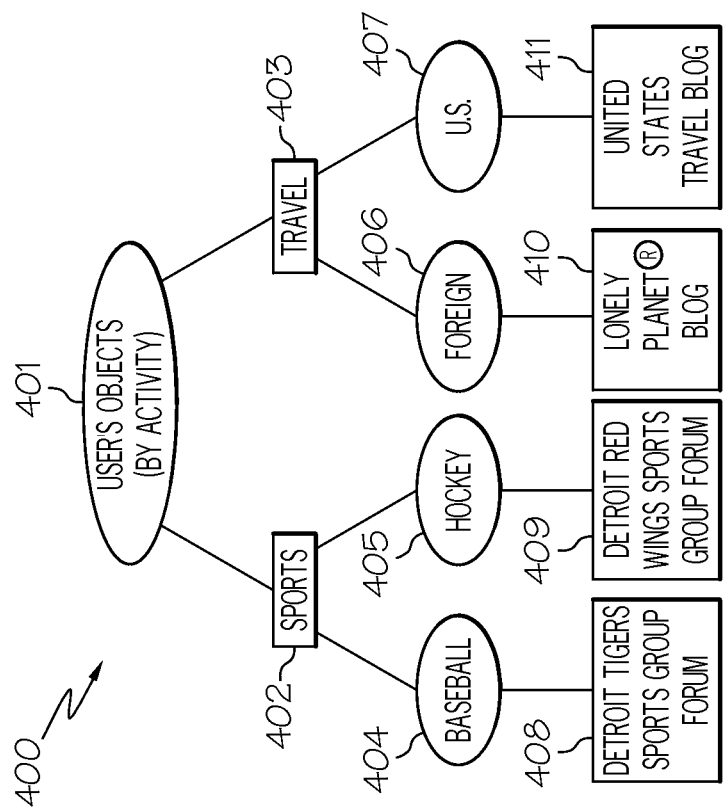
FIG. 4 illustrates a hierarchical tree of concept nodes established by rule patterns used to identify associations with social networking websites.
Figure 5:
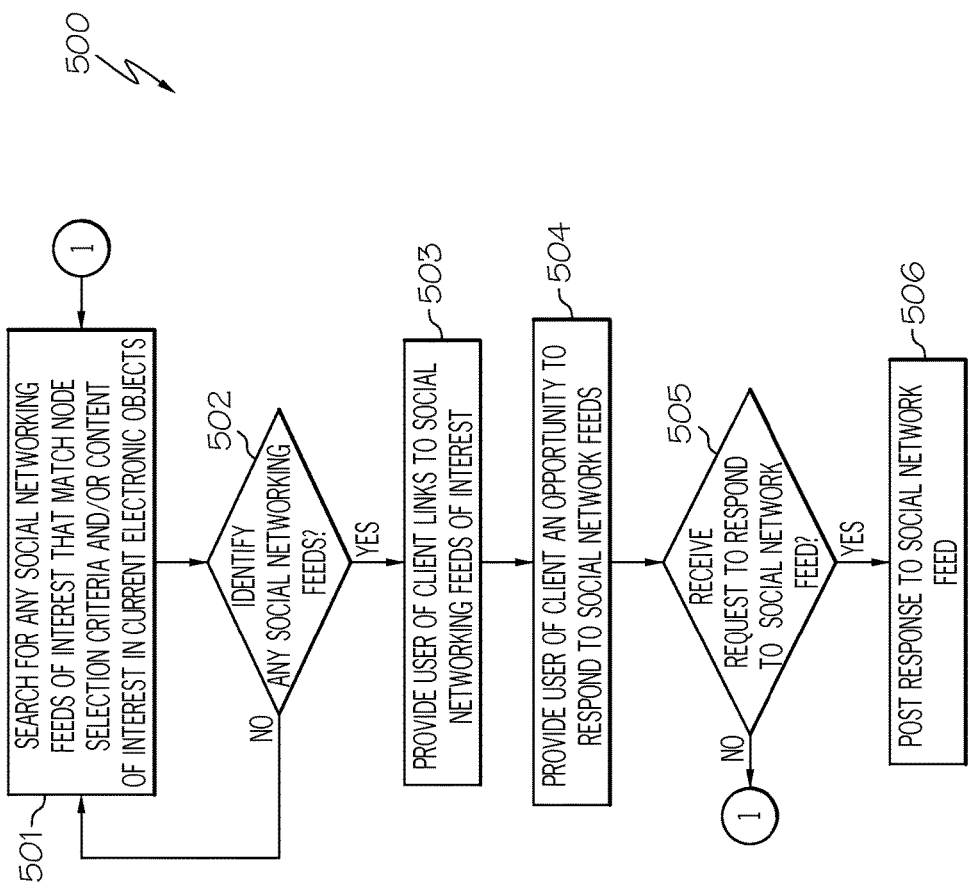
FIG. 5 is a flowchart of a method for identifying relevant social networking feeds to include information nuggets in accordance with an embodiment of the present invention.
Figure 6:
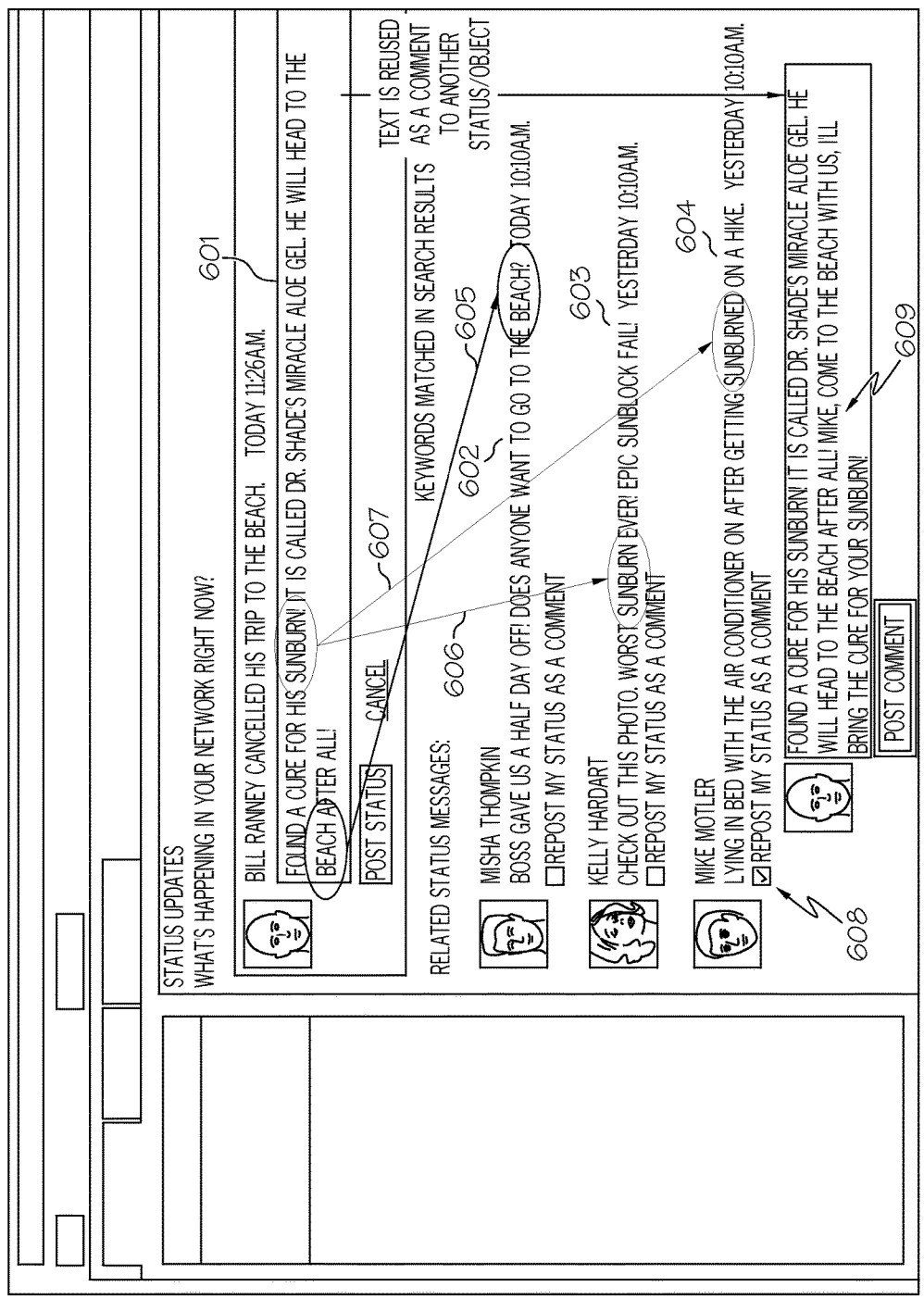
FIG. 6 illustrates a user reposting a comment in one of the social networking feeds identified as being relevant by the concept service server in accordance with an embodiment of the present invention.

The principles of the present invention provide a means for effectively exchanging information from traditional forms of communication (e.g., e-mail) to more recent types of communication (e.g., social networks) or even among different social networking feeds as discussed below in connection with FIGS. 3-6. FIG. 3 is a flowchart of a method for training concept service server 104 to heuristically associate information nuggets with particular social networking websites, including blogs, forums, communities. FIG. 4 illustrates a hierarchical tree of concept nodes established by rule patterns used to identify associations between the electronic objects and the social networking websites. FIG. 5 is a flowchart of a method for identifying relevant social networking feeds to include information nuggets, including current content posts. FIG. 6 illustrates a user reposting a comment in one of the social networking feeds identified as being relevant by concept service server 104.

As stated above, FIG. 3 is a flowchart of a method 300 for training concept service server 104 (FIGS. 1 and 2) to heuristically associate information nuggets with particular social networking websites, including blogs, forums, communities, in accordance with an embodiment of the present invention.

Referring to FIG. 3, in conjunction with FIGS. 1-2, in step 301, concept service server 104 receives a copy of an electronic object (e.g., e-mail, social feed) from client 101. For example, client 101 may have received an e-mail regarding the Detroit Tigers draft selections.

In step 302, concept service server 104 detects the actions performed on the electronic object by the user of client 101. Such actions may include active actions (e.g., copy, paste) or passive actions (e.g., highlighting) which are used to identify information nuggets of interest. For example, suppose that in the e-mail received by client 101 regarding the Detroit Tigers draft selections there was some information regarding a catcher that played in the user's hometown. The user may perform an action regarding such information, such as copying, pasting or highlighting, the information.

In step 303, concept service server 104 detects the entry of the electronic object, such as the information nugget of interest discussed above, in one or more social networking websites, including blogs, forums, communities, etc. For instance, referring to the example above, suppose that the user of client 101 would like to post the information regarding the catcher from his/her hometown that was drafted by the Detroit Tigers on his/her home page on Facebook® as well as on a particular sports group forum.

In step 304, concept service server 104 identifies any associations between the social networking websites and the electronic object received in step 301. For instance, referring to the example above, concept service server 104 identifies the association between the user's home page on Facebook® and the electronic object received in step 301, including the information nugget pertaining to the catcher draft by the Detroit Tigers. Furthermore, service server 104 identifies the association between the sports group forum used by the user of client 101 and the electronic object received in step 301, including the information nugget pertaining to the catcher draft by the Detroit Tigers.

In step 305, concept service server 104 identifies rule patterns based on the detected actions of the user (steps 302, 303) and the associations of the social networking websites with the electronic objects (step 304) as will be discussed in further detail below in connection with step 306.

In step 306, concept service server 104 stores indications of the associations (associations between the social networking websites and the electronic objects) in terms of concept nodes in a hierarchical tree using the identified rule patterns of step 305. In one embodiment, a hierarchical tree may be established that identifies conceptual relationships based on organization/categorization criteria. An example of such a hierarchical tree is presented in FIG. 4.

Referring to FIG. 4, FIG. 4 illustrates a hierarchical tree 400 of concept nodes established by rule patterns used to identify associations with social networking websites in accordance with an embodiment of the present invention. Referring to FIG. 4, in conjunction with FIGS. 1 and 3, hierarchical tree 400 illustrates the rule-based indexing provided by the present invention. A given node of tree 400 may have child nodes which are nested to an arbitrarily-deep level. An implementation of the present invention may choose, however, to place limits on the number of levels supported without deviating from the scope of the present invention.

Node 401, for example, shows that the objects are organized according to activity. It is noted that objects may be organized in other manners, such as by project, etc. and that FIG. 4 is used for illustrative purposes. Within the activity grouping, a node is displayed in the hierarchical tree 400 for each activity for which the user of client 101 has stored objects based on the organization/categorization criteria.

For example, referring to FIG. 4, in conjunction with FIGS. 1 and 3, sports 402 and travel 403 are activities represented in tree hierarchy 400. Sports 402 are further organized to particular categories, such as baseball 404 and hockey 405; whereas, travel 403 is further organized to particular types of travel, such as foreign 406 and the United States 407.

Tree hierarchy 400 further illustrates an association between these concepts or activities to various social networking websites based on the rule patterns deduced by concept service server 104. These rule patterns are based on the actions of the user of client 101 performed on an electronic object (detected by concept service server 104 in step 302) and the entry of the electronic object in a social networking website (detected by concept service server 104 in step 303). For instance, referring to the above example, if the user of client 101 copies and pastes the information nugget pertaining to the catcher draft by the Detroit Tigers in a particular social forum (e.g., Detroit Tigers sports group forum represented by concept node 408), then concept service server 104 may associate such a sports forum with the category of baseball (represented by the concept node of 404), especially if the user consistently inputs information nuggets regarding baseball in this particular social forum. Similarly, the user of client 101 may input information nuggets pertaining to the category of hockey in a sports group forum (e.g., Detroit Red Wings sports group forum represented by concept node 409). Other examples include the user of client 101 inputting information nuggets pertaining to the category of foreign travel in a blog (e.g., Lonely Planet® blog represented by concept node 410) as well as inputting information nuggets pertaining to the category of United States travel in a blog (e.g., United States travel blog represented by concept node 411). Using the examples above, an example of a rule pattern would be that when the string of "Detroit Tigers" is present in an electronic object, there is an association with that electronic object to the category of sports, sub-category of baseball and the social networking website represented by node 408.

In one embodiment, concept service server 104 deduces attributes, such as tag values, based on the detected actions in steps 302, 303. A tag is a term that is associated with a piece of information, such as a value that indicates the degree of correlation between the information nugget in question and the social networking website. In one embodiment, concept service server 104 may assign weight and/or a confidence level to express the degree of correlation between the information nugget in question and the social networking website. In this manner, concept service server 104 may apply such weights/confidence levels in recommending social networking feeds as discussed further below in connection with FIG. 5.

Returning to FIG. 3, in some implementations, method 300 may include other and/or additional steps that, for clarity, are not depicted. Further, in some implementations, method 300 may be executed in a different order presented and that the order presented in the discussion of FIG. 3 is illustrative. Additionally, in some implementations, certain steps in method 300 may be executed in a substantially simultaneous manner or may be omitted.

After training concept service server 104 to heuristically associate information nuggets with particular social networking websites, including blogs, forums, communities, concept service server 104 identifies relevant social networking feeds to include information nuggets, including current content posts, that match the node selection criteria and/or content of interest in current electronic objects as discussed below in connection with FIG. 5.

FIG. 5 is a flowchart of a method 500 for identifying relevant social networking feeds to include information nuggets, including current content posts, in accordance with an embodiment of the present invention.

Referring to FIG. 5, in conjunction with FIGS. 1-2 and 4, in step 501, concept service server 104 searches for any social networking feeds of interest using hierarchical tree 400 and a current electronic object of the user of client 101 that match node selection criteria and/or content of interest in current electronic objects.

"Match node selection criteria," refers to using the rule-based indexing depicted in hierarchical tree 400 via the inter-relationships between the concept nodes. Match node selection criteria applies the rule patterns to the current electronic object (discussed in more detail below) to determine if there is a rule pattern associated with the content (e.g., string) present in the current electronic object. A "current electronic object" refers to an electronic object (e.g., e-mail, status message on a social networking feed, comment on a social networking feed) currently being inputted by the user, such as an object that is currently being typed by the user. For example, referring to the examples above, suppose that the user of client 101 is currently typing a social feed regarding last night's victory by the Detroit Tigers. Using the concept nodes of hierarchical tree 400, concept service server 104 may determine that there is a rule pattern associated with the string of "Detroit Tigers" in the current electronic object (social feed) where the social networking website represented by node 408 is associated with the string of "Detroit Tigers." As a result, such a social networking website may be identified as a social networking feed of interest by concept service server 104.

Content of interest refers to keywords (e.g., the term "sunburn" in a post regarding the cure for a sunburn) in the content of the current electronic object. An example of concept service server 104 identifying social networking feeds of interest that match the content of interest in current electronic objects is discussed further below in connection with FIG. 6.

Referring again to FIG. 5, in conjunction with FIGS. 1-2 and 4, in step 502, a determination is made by concept service server 104 if it has identified any social networking feeds that matched the node selection criteria and/or content of interest in current electronic objects. If no social networking feeds matched the node selection criteria and/or content of interest in current electronic objects, then concept service server 104 continues to search for any social networking feeds of interest that match node selection criteria and/or content of interest in current electronic objects in step 501.

If, however, concept service server 104 identified one or more social networking feeds of interest, then, in step 503, concept service server 104 provides the user of client 101 links to the identified social networking feeds of interest. In one embodiment, these links are to social networking feeds of interest that are believed to be of interest to the user of client 101 based on the content of the user's current electronic object, including the scenario of when the user is in the process of typing the electronic object. In one embodiment, these links are to social networking feeds of interest that are believed to be of interest to the user to post a reply, including reposting a previously posted message as well as posting information nuggets from traditional forms of communication. In one embodiment, such links may be provided to the user via traditional forms of communication, such as e-mail or instant messaging.

In step 504, concept service server 104 provides the user of client 101 an opportunity to respond to the identified social networking feeds of interest. In this manner, the user of client 101 can more effectively exchange information with other users by responding to these social networking feeds using information nuggets from traditional forms of communication as well as reposting previously posted messages on other social networking feeds.

For example, referring to FIG. 6, FIG. 6 illustrates a user reposting a comment in one of the social networking feeds identified as being relevant by concept service server 104 in accordance with an embodiment of the present invention. As illustrated in FIG. 6, a user of client 101 with the name of Bill Ranney is currently in the process of posting a status update 601 regarding a cure for sunburn. Concept service server 104 identified three potential social networking feeds of interest, identified as elements 602, 603 and 604. Social network feed 602 was identified by concept service server 104 based on the term "beach" in the status update which was identified as a keyword by concept service server 104. Social network feeds 603, 604 were identified based on the use of the term "sunburn" as indicated by arrows 606, 607. The term "sunburn" in the status update was identified as being a keyword by concept service server 104. In the example of FIG. 6, the user of client 101 indicates to repost the text of the status update to social network feed 604 as a comment (indicated by arrow 608). In one embodiment, the user of client 101 is provided an option to edit the original post prior to being posted on one of the selected social network feeds as discussed below in connection with step 506. For example, referring to FIG. 6, the user Bill Ranney is able to add additional text ("Mike, come to the beach with us, I'll bring the cure for your sunburn!") to his original post ("found a cure for his sunburn! It is called Dr. Shade's Miracle Aloe Gel. He will head to the beach afterall!") as shown by arrow 609.

Returning to FIG. 5, in conjunction with FIGS. 1-2 and 4, in step 505, concept service server 104 determines whether it received a request to respond to one of the social networking feeds provided to the user of client 101 in step 504.

If the user indicates that he/she does not want to respond to any of the social networking feeds provided to the user, then concept service server 104 continues to search for any social networking feeds of interest that match node selection criteria and/or content of interest in current electronic objects in step 501.

If, however, the user indicates, such as by selection as illustrated in FIG. 6, that he/she does want to respond to one or more of the social networking feeds, then, in step 506, concept service server 104 posts the response to the selected one or more social networking feeds. Posting of the response may include a reposting of prior posts on a social network website. Posting of the response may also include a reposting of information nuggets from traditional forms of communication. In one embodiment, the user of client 101 may modify the current electronic object (e.g., status message on a social networking feed) such that it is uniquely tailored for the social networking feed identified by concept service server 104. As a result, concept service server 104 may post a tailored response to the selected one or more social networking feeds.

In some implementations, method 500 may include other and/or additional steps that, for clarity, are not depicted. Further, in some implementations, method 500 may be executed in a different order presented and that the order presented in the discussion of FIG. 5 is illustrative. Additionally, in some implementations, certain steps in method 500 may be executed in a substantially simultaneous manner or may be omitted.

Although the method, system and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims.

The invention claimed is:

1. A computer program product embodied in a computer readable storage device for improving information exchange in a social network environment, the computer program product comprising the programming instructions for:

receiving, by a concept service server, a copy of an e-mail, a status update or a comment from a client;

detecting, by said concept service server, copying, pasting or highlighting performed on said e-mail, said status update or said comment by a user of said client;

detecting, by said concept service server, entry of said e-mail, said status update or said comment in a social networking website;

identifying, by said concept service server, an association between said social networking website and said e-mail, said status update or said comment;

identifying, by said concept service server, one or more rule patterns based on said detected copying, pasting or highlighting, said detected entry of said e-mail, said status update or said comment in said social networking website and said identified association between said networking website and said e-mail, said status update or said comment;

storing, by said concept service server, an indication of said association between said social networking website and said e-mail, said status update or said comment in terms of concept nodes in a hierarchical tree using said identified one or more rule patterns;

searching, by said concept service server, for any social networking feeds of interest using said hierarchical tree as well as a current e-mail, status update or comment of said user;

identifying a social networking feed of interest that matches node selection criteria for said concept nodes; and providing said user an opportunity to respond to said identified social networking feed of interest.

2. The computer program product as recited in claim 1 further comprising the programming instructions for:
providing said user a link to said identified social networking feed of interest.

3. The computer program product as recited in claim 1 further comprising the programming instructions for:
providing said user a link to said identified social networking feed of interest that also matches one or more keywords in said current e-mail, status update or comment of said user.

4. The computer program product as recited in claim 1 further comprising the programming instructions for:
posting a response to said identified social networking feed of interest.

5. The computer program product as recited in claim 4, wherein said response comprises a reposting of a post.

6. The computer program product as recited in claim 4, wherein said response comprises a reposting of an information nugget from an electronic message.

7. A concept service server, comprising:
a memory unit for storing a computer program for improving information exchange in a social network environment; and
a processor coupled to said memory unit, wherein said processor, responsive to said computer program, comprises:

circuitry for receiving a copy of an e-mail, a status update or a comment from a client;

circuitry for detecting copying, pasting or highlighting performed on said e-mail, said status update or said comment by a user of said client;

circuitry for detecting entry of said e-mail, said status update or said comment in a social networking web site;

circuitry for identifying an association between said social networking web site and said e-mail, said status update or said comment;

circuitry for identifying one or more rule patterns based on said detected copying, pasting or highlighting, said detected entry of said e-mail, said status update or said comment in said social networking website and said identified association between said networking website and said e-mail, said status update or said comment;

circuitry for storing an indication of said association between said social networking website and said e-mail, said status update or said comment in terms of concept nodes in a hierarchical tree using said identified one or more rule patterns;

circuitry for searching for any social networking feeds of interest using said hierarchical tree as well as a current e-mail, status update or comment of said user;

circuitry for identifying a social networking feed of interest that matches node selection criteria for said concept nodes; and circuitry for providing said user an opportunity to respond to said identified social networking feed of interest.

8. The concept service server as recited in claim 7, wherein said processor further comprises:
circuitry for providing said user a link to said identified social networking feed of interest.

9. The concept service server as recited in claim 7, wherein said processor further comprises:
circuitry for providing said user a link to said identified social networking feed of interest that also matches one or more keywords in said current e-mail, status update or comment of said user.

10. The concept service server as recited in claim 7, wherein said processor further comprises:
circuitry for posting a response to said identified social networking feed of interest.

11. The concept service server as recited in claim 10, wherein said response comprises a reposting of a post.

12. The concept service server as recited in claim 10, wherein said response comprises a reposting of an information nugget from an electronic message.

* * * * *